S. B. MARTIN.
Device for Releasing Animals from Stalls.
No. 196,242. Patented Oct. 16, 1877.
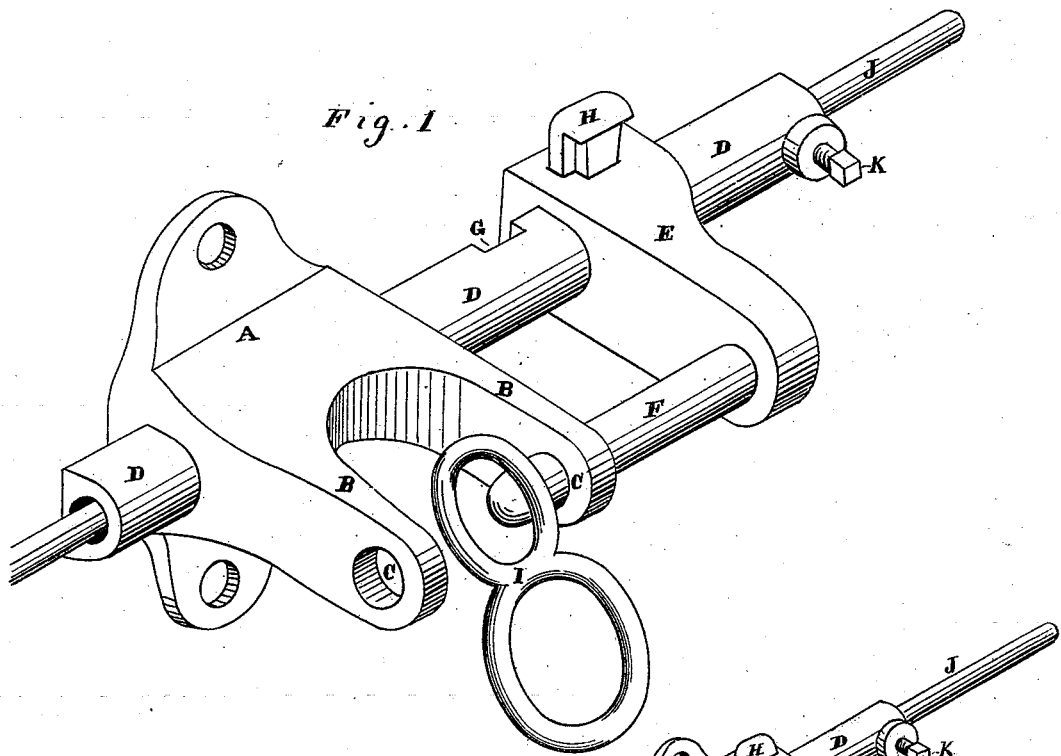
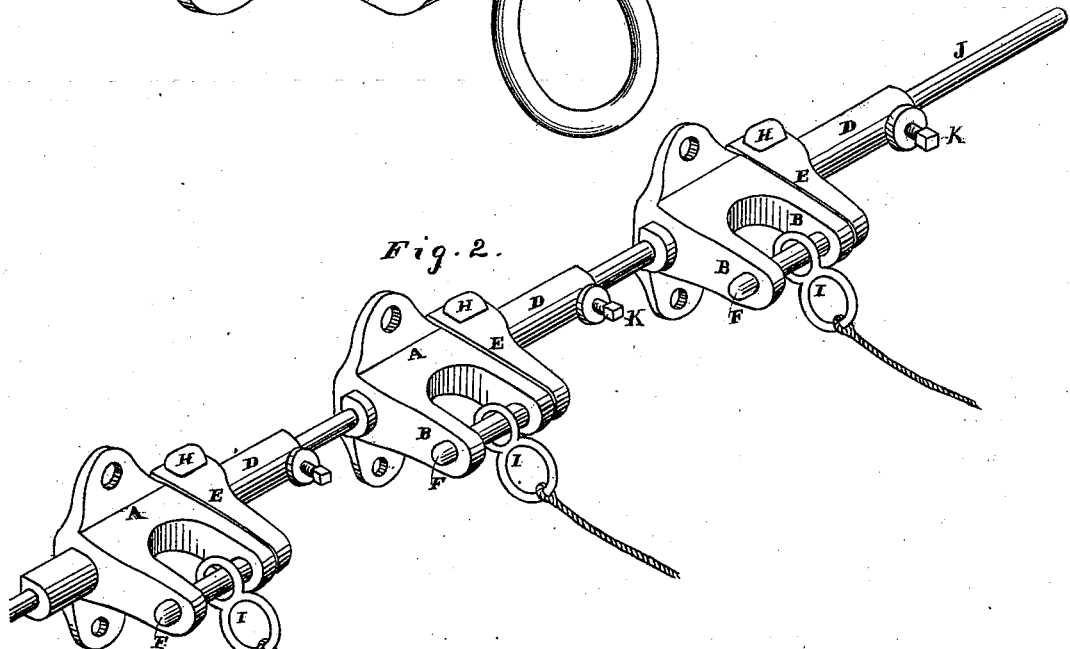
Witnesses
Geo. H. Strong
Wm. D. English
Inventor
Saml. B. Martin

UNITED STATES PATENT OFFICE.

SAMUEL B. MARTIN, OF SAN FRANCISCO, CALIFORNIA.

IMPROVEMENT IN DEVICES FOR RELEASING ANIMALS FROM STALLS.

Specification forming part of Letters Patent No. 196,242, dated October 16, 1877; application filed March 27, 1877.

*To all whom it may concern:*

Be it known that I, SAMUEL B. MARTIN, of the city and county of San Francisco, and State of California, have invented a Device for Releasing Animals from Stalls; and I do hereby declare the following to be a full, clear, and exact description thereof, reference being had to the accompanying drawings.

My invention relates to a novel means for releasing animals from their stalls or fastenings, either singly for the purpose of removing them for ordinary use, or, in case of a fire or other emergency, to free all the animals at once by a single operation; and it consists in the use of a stationary socketed plate, which is secured to the front of the stall, and a sliding bolt, which crosses the socket, and which is provided with a local means for the operation of each one singly, and a general connection, whereby all of the fasteners may be operated at once.

Referring to the accompanying drawings for a more complete explanation of my invention, Figure 1 is a view of the device open for releasing. Fig. 2 is a view showing the attachment of a series to a rod by which all are operated.

A is a plate or fixture, which is secured to the wall, front of the stall, or other convenient place, and has projecting lugs or cheeks B, which are perforated, as shown at C.

Through the rear portion of the plate A an aperture is made horizontally, sufficiently large to allow the tubular bar D to be inserted.

An arm, E, is fitted to slide upon the bar D at one side of the lugs B, and this arm carries a pin, F, which will enter the hole C, or be withdrawn from it by sliding the arm E forward or back along the bar D. This bar has a slot, G, made in its back, and a key, H, passes through the arm E, so that when opposite the slot G, and with the pin F passing through the holes C, the key will fall into the slot, and thus lock the sliding arm and retain the pin in position across the opening G.

The fastening may be a ring, I, to the end of the halter, or simply a loop on the halter, so that the pin F will pass through it and hold it.

When it is necessary to release a single animal for any purpose, it may be done by lifting or withdrawing the key H from the slot G, and this allows the arm E to be moved along the bar D, so as to withdraw the pin F from the hole C and allow the halter to be disengaged.

The plates A for any series of stalls are secured in each stall so that the tubular bars D shall be in line, and a rod, J, passes through all these bars, from one end to the other of the whole series, and it is arranged to be accessible, so as to be operated from either end of the building.

The bars D are secured to the rod by a set-screw, K, and it will be seen that if the rod J is withdrawn by moving it from either end, or in emergency from any point at which it is accessible, all the bars D, with their arms E and the pins F, will be withdrawn at once, and all the animals which may be secured thereby will be released simultaneously.

It will be seen that this movement is very short, and any number of animals can be instantly released by a simple movement of the rod of two or three inches.

The importance of this will be readily seen in the case of a fire, where the lives of valuable animals are at stake, and although the rod J is intended to be operated from either end of the building or series of stalls, yet, if necessary, it can be operated from any point where it can be reached.

Having thus described my invention, what I claim, and desire to secure by Letters Patent, is—

1. The sliding arm E, with its key H, by operating which the arm may be secured to, or released from, the bar D, said arm being provided with a pin, F, which enters the holes C in the lugs B, to secure or release a halter, substantially as herein described.

2. A series of independent securing and releasing devices, each consisting of a fixed plate, A, with lugs B, pin F, secured to the sliding arm E, key H, and bar D, in combination with the rod J, by which all the devices may be actuated at one movement, substantially as herein described.

In witness whereof I have hereunto set my hand and seal.

SAML. B. MARTIN. [L. S.]

Witnesses:
 WM. D. ENGLISH,
 GEO. H. STRONG.